(12) United States Patent
Titus

(10) Patent No.: US 6,202,679 B1
(45) Date of Patent: Mar. 20, 2001

(54) FLUID METERING APPARATUS

(75) Inventor: John S. Titus, Prior Lake, MN (US)

(73) Assignee: Perception Incorporated, Prior Lake, MN (US)

( * ) Notice: Subject to any disclaimer, the term of this patent is extended or adjusted under 35 U.S.C. 154(b) by 0 days.

(21) Appl. No.: 09/292,144

(22) Filed: Apr. 15, 1999

Related U.S. Application Data

(60) Division of application No. 09/055,601, filed on Apr. 6, 1998, now Pat. No. 5,902,927, which is a continuation-in-part of application No. 08/872,546, filed on Jun. 10, 1997, now abandoned, which is a continuation of application No. 08/566,019, filed on Dec. 1, 1995, now Pat. No. 5,636,653.

(51) Int. Cl.⁷ .................................. G05D 7/06
(52) U.S. Cl. .................................. 137/487.5; 137/557
(58) Field of Search .................. 137/487.5, 557

(56) References Cited

U.S. PATENT DOCUMENTS

| | | |
|---|---|---|
| 3,007,414 | 11/1961 | Long et al. . |
| 3,196,900 | 7/1965 | Catheron et al. . |
| 3,725,648 | 4/1973 | Schmick et al. . |
| 4,085,287 | 4/1978 | Kullmann et al. . |
| 4,086,434 | 4/1978 | Bocchi . |
| 4,392,611 | 7/1983 | Bachman et al. . |
| 4,530,463 | 7/1985 | Hiniker et al. . |
| 4,581,707 | 4/1986 | Millar . |
| 4,637,547 | 1/1987 | Hiniker et al. . |
| 4,665,938 | 5/1987 | Brown et al. . |
| 4,679,583 | 7/1987 | Lucas et al. . |
| 4,833,618 | 5/1989 | Verma et al. . |
| 4,839,790 | 6/1989 | Fujimoto et al. . |
| 4,866,633 | 9/1989 | Nakane et al. . |
| 4,899,217 | 2/1990 | MacFadyen et al. . |
| 4,918,995 | 4/1990 | Pearman et al. . |
| 4,940,976 | 7/1990 | Gastouniotis et al. . |
| 5,126,934 | * 6/1992 | MacFadyen ............... 137/487.5 X |
| 5,190,068 | * 3/1993 | Philbin ................... 137/487.5 X |
| 5,198,989 | 3/1993 | Petroff . |
| 5,251,148 | 10/1993 | Haines et al. . |
| 5,261,276 | 11/1993 | Gifford . |
| 5,327,488 | 7/1994 | Garland . |
| 5,369,598 | 11/1994 | Horiike et al. . |
| 5,636,653 | * 6/1997 | Titus ...................... 137/487.5 X |

FOREIGN PATENT DOCUMENTS 2 251 963    7/1992   (GB) .

* cited by examiner

Primary Examiner—Gerald A. Michalsky
(74) Attorney, Agent, or Firm—Altera Law Group LLC

(57) ABSTRACT

A method and apparatus are described for controlling demand of a fluid. The method includes measuring a fluid supply pressure in a supply pipe, determining that the fluid supply pressure is lower than a predetermined threshold supply pressure, and directing a control signal from the fluid information unit to the one or more demand control units to reduce demand for the fluid. In addition, a method and apparatus are described for measuring density of a fluid flowing through a demand pipe. The method includes determining that fluid flow through the demand pipe is stable, measuring fluid flow rate through the demand pipe, preventing the fluid from flowing into the demand pipe for a sample period of time, measuring a drop in fluid pressure in the demand pipe during the sample period, and determining the density from the measured pressure drop. Also, a utility meter for metering a fluid flowing through a supply pipe and a demand pipe having an audible indicator to provide an audible signal to a user is described.

12 Claims, 12 Drawing Sheets

FLUID METERING APPARATUS

This application is a Divisional of application Ser. No. 09/055,601, filed Apr. 6, 1998, which issued as U.S. Pat. No. 5,902,927, which is a Continuation-in-Part of Ser. No. 08/872,546, filed on Jun. 10, 1997, now abandoned, which is a Continuation of Ser. No. 08/566,019, filed Dec. 1, 1995, which issued as U.S. Pat. No. 5,636,653, which application (s) are incorporated herein by reference.

FIELD OF THE INVENTION

The present invention relates generally to measuring fluid flow and, more particularly, to a method and apparatus for metering and controlling fluid flowing through a fluid delivery system.

BACKGROUND OF THE INVENTION

A wide variety of fluid flow measuring devices have been developed for use in fluid delivery systems in an attempt to accurately determine the volume of the fluid delivered through the delivery system and, more particularly, to the volume of fluid delivered to a particular user of the fluid delivery system. Most natural gas utilities, for example, provide a gas meter at each user location. Such conventional gas meters typically include a diaphragm-type flow sensing apparatus having an accuracy that varies widely as the function of the relative pressure drop across the diaphragm and a number of environmental conditions, such as ambient temperature and relative atmospheric pressure. Such conventional gas meters are typically expensive, bulky, and very difficult to repair and maintain. Moreover, conventional gas and water utility meters require periodic manual reading of the meter in order to determine consumer usage of the fluid over a particular period of time. The manually collected fluid meter information must then be input to a computerized billing system which subsequently issues a bill to the consuming user on a periodic basis.

There is a trend in gas and water utilities towards increased competition for consumer business. Multi-tiered pricing schemes, for example, are currently being used by some utilities to charge users varying rates for gas and water depending on a particular usage. In accordance with such a pricing scheme, essential uses of natural gas, such as for air and water heating, for example, are generally priced at a lower rate than gas used for luxury purposes, such as for heating outdoor pools. Further, it is anticipated that enhanced control over gas and water delivery systems from remote locations will be desirable for providing enhanced service and safety features. It can be appreciated that conventional fluid metering devices and systems cannot be practicably adapted to provide such enhanced functionality, which will certainly be required in a de-regulated competitive utility market.

SUMMARY OF THE INVENTION

The present invention is directed to a method and apparatus for controlling demand of a fluid using a fluid information unit connectable to one or more appliance demand control units. The method includes measuring a fluid supply pressure in a supply pipe, determining that the fluid supply pressure is lower than a predetermined threshold supply pressure, and directing a control signal from the fluid information unit to the one or more demand control units to reduce demand for the fluid.

The apparatus for controlling fluid demand includes a supply pressure sensor disposed to measure a fluid supply pressure in the supply pipe and a fluid information unit connectable to the demand control unit. The fluid information unit includes a demand pressure sensor disposed to sense a fluid demand pressure in the demand pipe, a communications channel connected to the supply pressure sensor, and a processor, coupled to the supply and demand pressure sensors and couplable to the demand control unit to transmit a control signal to reduce fluid demand in response to a measured supply pressure falling below a predetermined supply threshold level.

Another embodiment of the invention is directed to a method and apparatus for measuring density of a fluid flowing through a demand pipe. The method includes determining that fluid flow through the demand pipe is stable, measuring fluid flow rate through the demand pipe, preventing the fluid from flowing into the demand pipe for a sample period of time, measuring a drop in fluid pressure in the demand pipe during the sample period, and determining the density from the measured pressure drop.

The apparatus for measuring fluid density includes a fluid dispensing unit including a controllable valve couplable to an inlet of the demand pipe and a fluid information unit. The fluid information unit includes a demand pressure sensor for sensing a demand fluid pressure of the fluid in the demand pipe, a first communication channel between the fluid information unit and the controllable valve of the fluid dispensing unit, and a processor, coupled to the demand pressure sensor and the controllable valve, for controlling the controllable valve between a closed and an open position to regulate the fluid flowing through the controllable valve.

Another embodiment of the invention is directed to a utility meter for metering a fluid flowing through a supply pipe and a demand pipe. The meter includes a metering unit connectable between the supply pipe and the demand pipe to measure fluid flow therebetween, a control unit, coupled to the metering unit, to receive metering information therefrom; and an audible indicator connected to the control unit, to provide an audible signal to a user.

DETAILED DESCRIPTION

Figure 1:
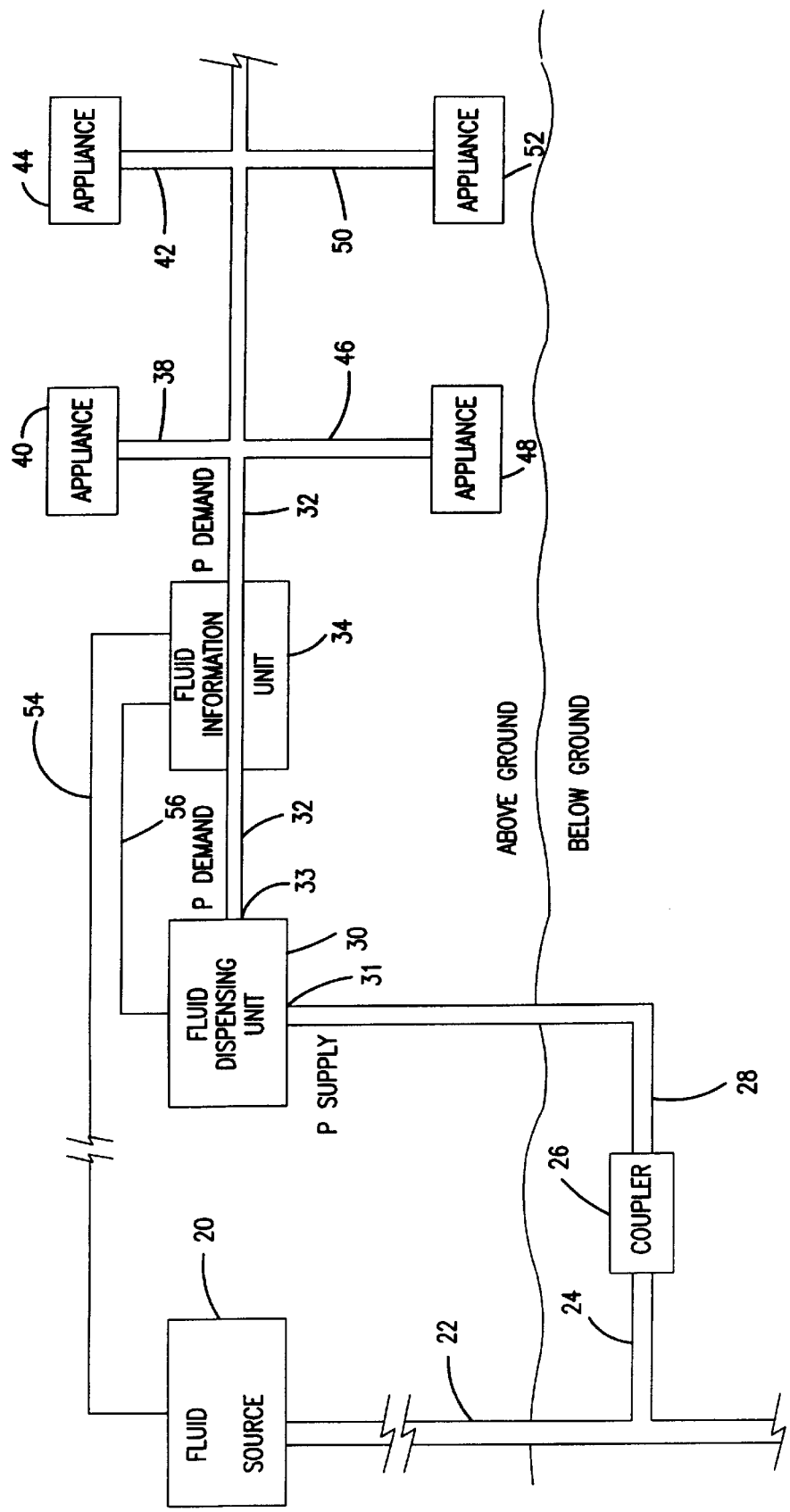
FIG. 1 is a depiction of an embodiment of a fluid metering apparatus in accordance with the present invention.

Referring now to the drawings, and more particularly to FIG. 1, there is illustrated in system block diagram form, a system for metering fluid received from a supply pipe and dispensed to a demand pipe. A fluid dispensing unit 30 receives fluid from the supply pipe 28 at an input port 31, and dispenses the fluid to a demand pipe 32 through an output port 33. The pressure of the fluid in the supply pipe 28 is generally at a pressure greater than the pressure of the fluid in the demand pipe 32.

The fluid dispensing unit 30 includes a pressure sensor for sensing the pressure of the fluid in the supply pipe 28, and also includes a controllable valve disposed between the supply pipe 28 and the demand pipe 32. A fluid information unit 34 includes a pressure sensor for sensing the pressure of the fluid in the demand pipe 32, and also includes a processor for coordinating the operation of the fluid dispensing and information units 30 and 34. The fluid information unit 34 communicates with the fluid dispensing unit 30 over a communication line 56 to cooperatively control the flow of fluid from the supply pipe 28 to the demand pipe 32 so as to maintain the pressure of the fluid in the demand pipe 32 at a pre-established demand pressure level. More particularly, the fluid information unit 34 produces valve control signals communicated to the controllable valve disposed in the fluid dispensing unit 30 to equilibrate the pressure of the fluid in the demand pipe 32 with the pre-established demand pressure level as the fluid flows through the demand pipe 32.

In accordance with another embodiment, the functions performed by the fluid dispensing unit 30 and the fluid information unit 34 can be achieved within a single metering unit, rather than by the two remotely located fluid dispensing and fluid information units 30 and 34. In such a configuration, the fluid dispensing unit 30 may be modified to determine the supply fluid pressure in the supply pipe 28 as well as determine the demand fluid pressure in the demand pipe 32. The fluid dispensing unit 30, having incorporated the valve control functionality of the fluid information unit 34 in accordance with this embodiment, produces the valve control signals to control the controllable valve to equilibrate the pressure of the fluid in the demand pipe 32 with the pre-established demand pressure level as the fluid flows through the demand pipe 32. The fluid dispensing unit 30 then computes the volume of fluid flowing through the controllable valve.

Returning to the embodiment depicted in FIG. 1, a number of appliances or loads 40, 44, 48, and 52 are coupled to the demand pipe 32 and expend fluid from the demand pipe 32 on a selective or continuous basis. As the appliances expend the fluid received from the demand pipe 32, the fluid information unit 34 senses a change in the pressure in the demand pipe 32 and, in response, produces and transmits a valve control signal to the fluid dispensing unit 30. In response to the valve control signal, a controllable valve disposed in the fluid dispensing unit 30 is actuated so as to modify the flow of fluid therethrough to offset the change in demand pipe 32 pressure. Closed-loop monitoring and dispensing of the fluid through the controllable valve provide for a relatively constant pressure of the fluid in the demand pipe 32 and at each of the appliances 40, 44, 48, and 52 coupled to the demand pipe 32. It is to be understood that the fluid metering apparatus and method described herein can be advantageously employed to accurately meter delivery of various types of fluid, including fluids in a gaseous or liquid phase.

An important advantage realized through employment of the fluid metering system illustrated in FIG. 1 concerns the significant increase in fluid metering accuracy over conventional fluid metering approaches. As described previously in the Background of the Invention, conventional fluid metering schemes are typically directed toward passively determining a flow rate of fluid delivered through a service pipe. Such passive metering approaches generally provide only a limited amount of usage information, are susceptible to varying degrees of inaccuracy, and are often expensive and difficult to repair and maintain.

In contrast to conventional passive metering techniques, the fluid metering apparatus illustrated in FIG. 1 provides for active dispensing of a fluid supplied through a supply pipe and delivered to a demand pipe to which one or more fluid-expending appliances are coupled. Monitoring of the demand fluid pressure by the fluid information unit 34 and controlled regulation of the fluid passing through the fluid dispensing unit 30 provides for a high degree of control of the fluid flowing through the demand pipe 32 and a high degree of accuracy with respect to measuring or metering fluid flow through the demand pipe 32. The fluid dispensing unit and fluid information unit are described further in U.S. Pat. No. 5,636,653, which is incorporated herein by reference.

Figure 2:
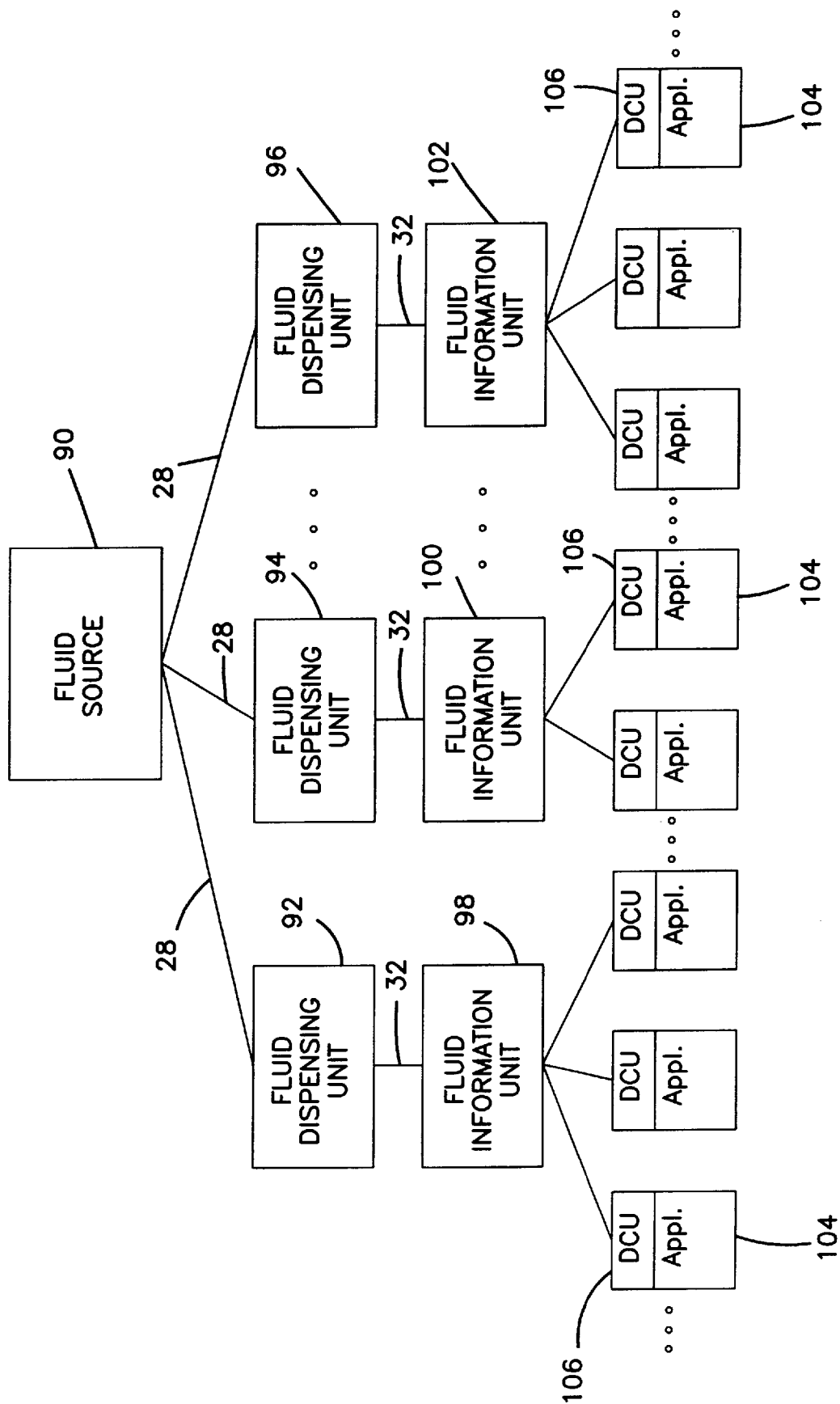
FIG. 2 is a depiction of a distributed fluid metering system in accordance with the present invention.

Referring now to FIG. 2, there is illustrated in system block diagram form a fluid delivery system including a fluid source 90 from which fluid is delivered to a plurality of dispensing units 92, 94, and 96. It is to be understood that the dispensing units may be individually provided at remote locations or at a single location, such as a university campus or other relatively large building complex. or within an industrial facility. Associated with the fluid dispensing units 92, 94, and 96 are respective fluid information units 98, 100, and 102, which, in turn, are coupled to a plurality of fluid-expending appliances 104 controlled by respective demand control units (DCU) 106. It is to be further understood that the appliances and demand control units illustrated in FIG. 2 are identified using non-unique reference numerals for purposes of discussion only, and does not imply that the appliances are equivalent in function or purpose. It will be appreciated that the fluid dispensing unit and fluid information unit may be used in connection with the delivery of fluid to any type of load that consumes or uses the fluid. Accordingly, the term "appliance" should be understood to cover any device to which the fluid is delivered, including, for example, industrial devices.

A significant advantage of the fluid metering apparatus and method of the present invention concerns the ability to control and accurately measure delivery of fluid from a fluid source 90 to a multiplicity of user locations. It is noted that the fluid source 90 may represent a utility, a distribution substation, or one or more gas or water mains, for example. More particularly, the metering system depicted in FIG. 2 provides for selective delivery of source fluid, such as natural gas, liquefied gas, or water, to any of a number of remote sites. Delivery of such fluids to particular appliances can be controlled locally by the individual fluid dispensing units 92, 94, and 96, and remotely by the managing entity of the fluid source 90. By way of example, it is assumed that the distributed system illustrated in FIG. 2 represents a municipal utility that provides natural gas to a plurality of residential homes each having a fluid dispensing unit, a fluid information unit, and a plurality of gas-consuming appliances coupled to respective demand control units.

Under certain circumstances, it may be desirable to selectively control the delivery of natural gas to certain essential appliances during periods in which gas availability is limited and demand is relatively high, such as during a prolonged period of extremely low temperatures or during a period of limited availability due to a broken gas main 28 or operational failure at the fluid source 90. In such situations, a fluid source provider or managing entity may transmit valve control signals to selected demand control units 106 and appliances 104 for purposes of reducing or eliminating gas flow to the appliance 104. In addition, valve control signals may be transmitted to selected fluid dispensing units to prevent gas from passing through the controllable valve disposed in the fluid dispensing unit, such as when maintenance to a gas main 28 to the fluid dispensing unit is required or an anomalous gas flow condition within a particular household is detected. Such selective removal of a load from the delivery system is often termed "load shedding". Advantageous load management of gas or other fluids through a fluid delivery system may be effected by employment of the fluid metering apparatus and method of the present invention. Load management is also known as demand side management, and the system for implementing the ability to manage the load is termed a demand side management system.

As discussed above, the need for load shedding may arise when the fluid demand by all the users on the network approaches the supply capacity. Ideally, the demand side management system initiates some measures, for example load shedding, before the demand exceeds the supply. In one particular embodiment, a fluid information unit 98 may be used to manage load shedding, either on a local basis or under control by the fluid source provider or managing entity. As an example of locally controlled demand side management, each fluid information unit 98 may be programed to periodically verify that the supply pressure is sufficiently high to supply the current demand, and to control flow of the fluid to its associated appliances 104 accordingly. As an example of centrally controlled demand side management, a centralized provider may direct instructions to the fluid information unit 34 to reduce the local fluid flow.

When the demand side management system is initiated, the fluid information unit 98 may direct control signals to one or more DCUs 106, ordering the DCUs to reduce fluid consumption. Fluid consumption may be reduced in a number of ways, such as shutting down the appliance for a period of time or simply reducing the rate at which fluid flows into the appliance. For example, where the appliance 104 is a heater, the control signals may override the heater's thermostat.

The fluid information unit 98 may also select which appliances 104 to control in response to the severity of the low supply pressure problem. In the present example of gas delivery to a house, the appliances 104 using the gas may be categorized according to importance, as illustrated in Table I. The least important appliances, such as a hot tub heater, pool heater and sauna, are categorized as level I. More important appliances, such as kitchen and laundry appliances, and water heaters are categorized as Level II. Furnaces are categorized as level III.

TABLE I

Sample categorization of fluid-fed appliances for DSM

| | |
|---|---|
| Level I | Hot tub heater, pool heater, sauna |
| Level II | Kitchen appliances, laundry appliances, water heater |
| Level III | Furnace #1, Furnace #2. |

Figure 4:
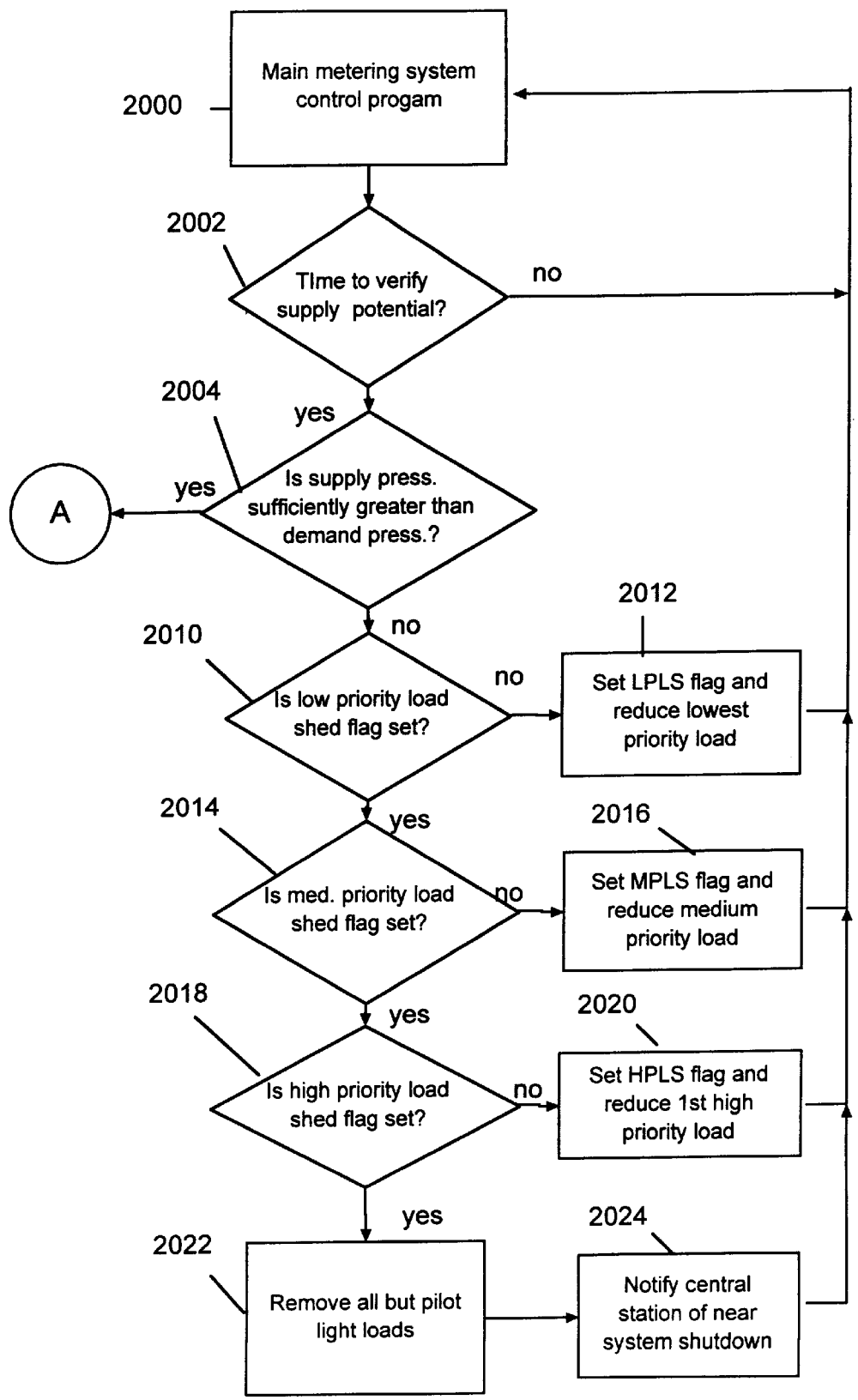
FIGS. 4–5 depict, in flow diagram form, a process for managing fluid demand by load shedding, in accordance with one embodiment of the present invention.
Figure 5:
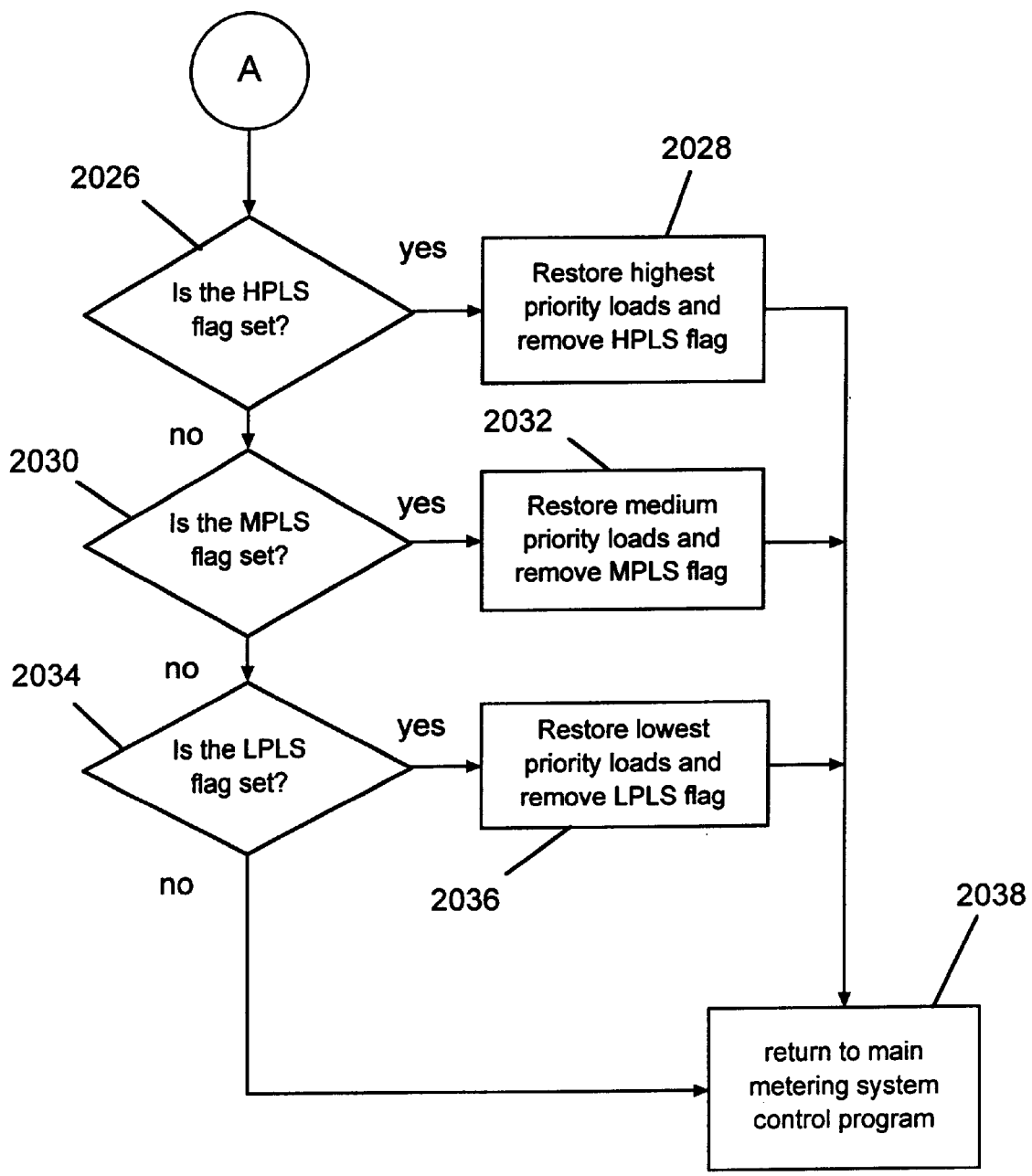

One particular embodiment of a procedure for managing fluid demand is illustrated in FIGS. 4 and 5. This procedure is based on load shedding, where selected appliances are shut down depending on the supply pressure. The main metering control program, step 2000, regularly checks that it is time to verify the supply potential, at step 2002. For example, the supply potential may be checked every 15 minutes. When it has confirmed that it is time to check the supply potential, the program then checks that the supply pressure is sufficiently greater than the demand pressure, at step 2004, for example by comparing the measured supply pressure against a threshold supply pressure.

An example of a criterion that may be used to determine that the supply pressure is sufficiently high, in step 2004, is that the measured supply pressure is greater than a threshold supply pressure which has been selected to be equal to the pre-established demand pressure level plus a given offset. In the natural gas delivery system of the current example, the pre-established demand pressure level may be 10 p.s.i., and the offset selected to be 5 p.s.i. In such a case, the demand side management system initiates some corrective measure when the supply pressure falls below the threshold supply pressure level of 15 p.s.i. Another example of a criterion is that the threshold supply side pressure be equal to the pre-selected demand side pressure multiplied by a safety factor. To illustrate, where the pre-established pressure level is 10 p.s.i. and the safety factor is selected to be 2, the threshold supply pressure is 20 p.s.i. Other criteria for selecting the initiation of demand side management, appropriate to the particular application, may also be used.

If the supply pressure is not sufficiently high, as determined at step 2004, then the program determines whether the low priority load shed (LPLS) flag is set, at step 2010. If the LPLS flag has not previously been set, then LPLS flag is set, at step 2012, and the fluid information unit 98 directs control signals to the appliances in level I, the lowest priority load, to reduce fluid consumption. The main system control program then resumes.

If the LPLS flag has previously been set, as determined at step 2010, the program then determines whether the medium priority load shed (MPLS) flag is set, at step 2014. If the MPLS flag has not previously been set, the MPLS flag is set, at step 2016. and the fluid information unit 98 directs control signals to the appliances in level II, the medium priority load, to reduce fluid consumption. The main system control program then resumes.

If the MPLS flag is set, the program then determines whether the high priority load shed (HPLS) flag is set, at step 2018. If the HPLS flag has not previously been set, the HPLS flag is set, at step 2020, and the fluid information unit 98 directs a control signal to the first high priority load, for example furnace #1, to reduce fluid consumption. The main system control program then resumes. If the HPLS flag is set, then all loads are removed except for pilot lights, step 2022, and a notification is sent to a central station, for example a provider or managing entity of the fluid source 90, indicating that that particular fluid information unit 98 has instructed all demand control units 106 to close down.

If it is determined that the supply pressure is sufficiently high, at step 2004, any loads which have previously been shed are slowly brought back on line. Not all loads which have been shed are brought back on line at the same time, because such a sudden increase in demand might cause another reduction in the supply pressure, which might lead to instabilities or oscillations in the load shedding management system. Therefore, the loads are brought back on line according to priority, the highest priority loads first, followed by the loads of lower priority.

Accordingly, it is determined, at step 2026, whether the HPLS flag has been set. If the HPLS flag has been set, then the highest priority loads are restored and the HPLS flag is removed, at step 2028. The program then returns to the main metering system control program, at step 2038.

If the HPLS flag has not been set, then it is determined whether the MPLS flag has been set, at step 2030. If the MPLS flag has been set, then the medium priority loads are restored and the MPLS flag is removed, at step 2032. The program then returns to the main metering system control program, at step 2038.

If the MPLS flag has not been set, then it is determined whether the LPLS flag has been set, at step 2034. If the LPLS flag has been set, then the lowest priority loads are restored and the LPLS flag is removed, at step 2036. The program then returns to the main metering system control program, at step 2038.

IF the LPLS flag has not been set, as determined at step 2034, then the program returns to the main metering system control program, at step 2038.

In this embodiment, at least four method loops are required before the central station is notified that the demand side management program has reached step 2022 and initiated a shutdown of the appliances 104. Where the demand side management loop is initiated every 15 minutes. it therefore takes one hour for all appliances 104 to be closed down. This is gradual process for shedding loads, thus providing time for other users to shed loads. Other fluid information units 100 and 102 in a community may also be on a similar 15 minute loop initiation schedule. However, the fluid information units 98, 100 and 102 are not all run by the same clock, and so the demand side management loop is initiated at different times for is each fluid information unit 98. Accordingly, in this embodiment, there is a reduced likelihood that the user of fluid information unit 98 will have to shed high priority loads, since other users, e.g. users of fluid information units 100 and 102, may have shed low priority loads before fluid information unit 98 has reached steps 2014 or 2018 in the demand side management process.

Where the supply pressure reaches extremely low values, for example around 1.5–2 p.s.i. or below, the demand side management system may be configured to close down all pilot lights. A message may be sent to the central station indicating that a pilot light has been shut down. When a pilot light has been shut down, the gas supply is not restored until a utility representative has made a site visit to relight the pilot light. Where all appliances connected to the fluid information unit 98 are pilotless, all appliances may be restored without a site visit from the utility representative.

Other procedures for shedding loads may be implemented in addition to the procedures illustrated in FIGS. 4 and 5. For example, a two-step load reduction process may be implemented for each priority level of appliances 104. Thus, the appliances in one priority level may first be ordered to reduce fluid consumption by a certain amount, e.g. 30%, in a first load reduction step, and then ordered to shut down in a second load reduction step. In this procedure, the appliances 104 in the next priority level are addressed only after the appliances 104 of the preceding priority level are shut down.

In another embodiment of a load shedding procedure, the selection of appliances 104 to be shut down may depend on the amount by which the measured supply pressure is less than the threshold supply pressure, $\Delta P$. As an example of this embodiment, level I appliances may be shut down where $\Delta P$ is within 0%–5% of the threshold supply pressure, level II appliances shut down when $\Delta P$ is between 5%–10% of the threshold supply pressure and level III appliances shut down when $\Delta P$ is more than 10% of the threshold supply pressure.

The fluid information unit 98 may contact a central station whenever load shedding is implemented, to indicate to the fluid distribution management that there is a perturbation in the supply pressure. The fluid information unit 98 may also make an historical log of load shedding activity, for example by storing in memory data concerning the date, time and amount of load shedding that takes place. The log of load shedding activity may be downloaded to a provider or managing entity of the fluid source 90 at a later time, for example through a modem 122 and communication line 54 as shown in FIG. 3.

Figure 3:
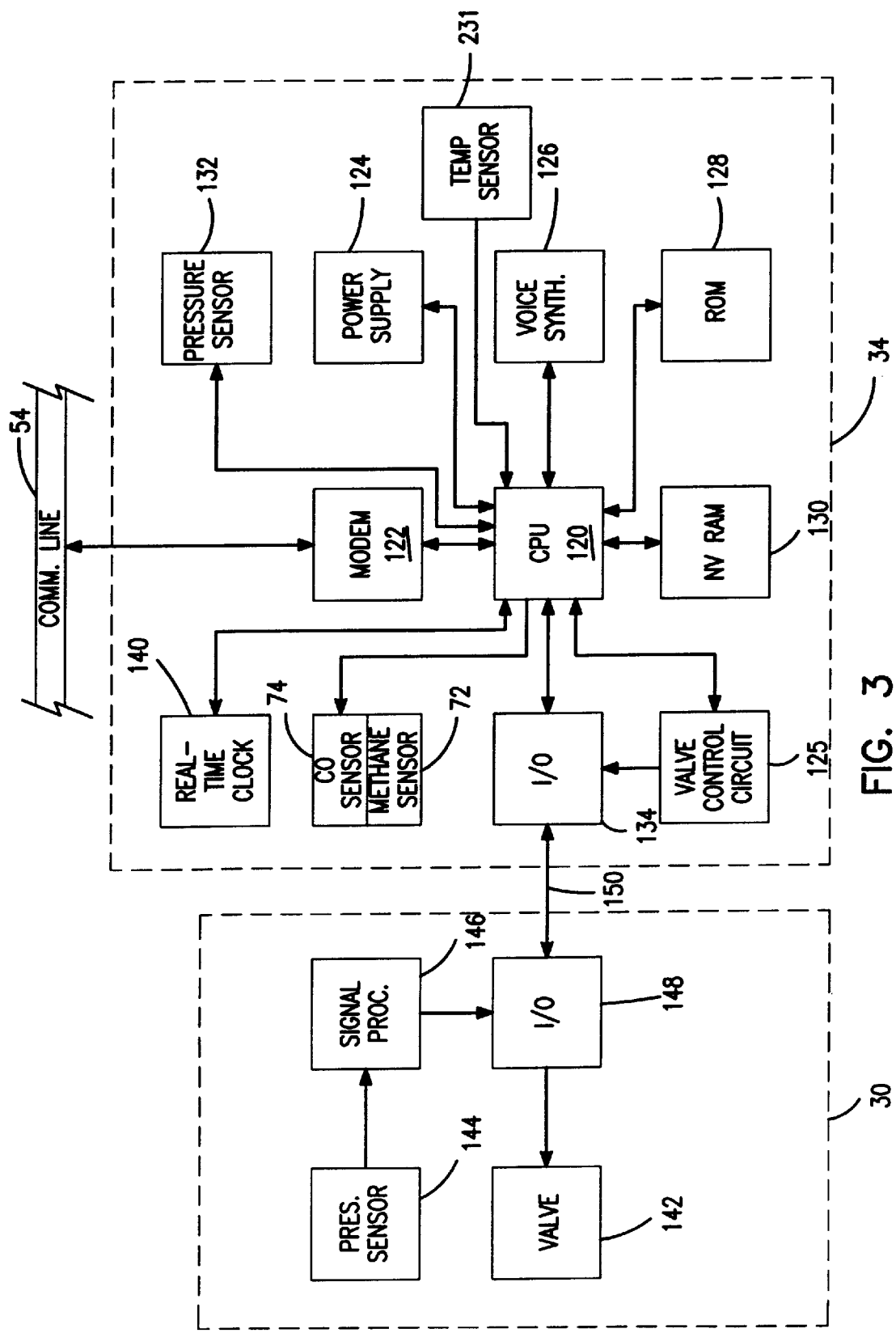
FIG. 3 is a system block diagram of a fluid dispensing unit and a fluid information unit employed in a fluid metering apparatus in accordance with the present invention.

Referring now to FIG. 3, there is illustrated an embodiment of a fluid metering system including a fluid dispensing unit 30 and a fluid information unit 34. As discussed previously, the fluid dispensing unit 30 is coupled to a supply pipe 28 and may be installed above or below ground level. The fluid dispensing unit 30 includes a controllable valve 142, a pressure sensor 144, a signal processor 146 coupled to the pressure sensor 144, and input/output (I/O) circuitry 148. Information and power signals are communicated between the input/output circuitry 148 of the fluid dispensing unit 30 and the input/output circuitry 134 of the fluid information unit 34 over a communication channel 150. The fluid information unit 34 includes a processor or central processing unit (CPU) 120 which coordinates the operation of the fluid information unit 34, the fluid dispensing unit 30, and communication of information and control signals transmitted and received over a communication line 54, such as a telephone or network communication line. Firmware operated on by the processor 120 is stored in a read-only memory (ROM) 128. The processor 120 has access to on-board or external non-volatile random-access memory (NVRAM) 130 which is utilized when executing program instructions embodied in the firmware and when processing information acquired from the fluid dispensing unit 30 and various sensors and other components that communicate signals to the processor 120. The NVRAM 130 may also be used for storing historical operational data, such as records of load shedding and other operational parameters.

A demand pressure sensor 132 senses the pressure PDEMAND in the demand pipe 32 and communicates signals representative of the demand fluid pressure PDEMAND to the processor 120. Supply fluid pressure PSUPPLY information is produced by the supply pressure sensor 144 of the fluid dispensing unit 30 and communicated to the processor 120 over the communication line 150. In response to a change in the demand fluid pressure PDEMAND from a pre-established demand pressure level PESTAB stored in ROM 128, the processor 120 produces valve control signals which are transmitted to the controllable valve 142 over the communication line 150 to effect a corresponding change in fluid flow through the valve 142 in order to offset the demand fluid pressure change. A temperature sensor 231 may be provided to detect temperature of the fluid flowing through the valve 142.

The processor 120 also receives signals from various sensors, including a carbon monoxide sensor 74, a methane gas sensor 72 and the temperature sensor 231. A real-time clock 140 provides current time and date information to the processor 120 for purposes of associating metered fluid usage data with a relevant period of time. The date and time stamped fluid usage data is communicated through a modem 122 to a communication line 54 for subsequent reception by a provider or managing entity of the fluid source 90. A voice synthesis circuit 126 is coupled to the processor 120 for generating verbal messages which may be communicated to a remote location through the communications interface 123. A power supply 124 provides power to the analog and digital components provided in the fluid information unit 34 and the fluid dispensing unit 30. A valve input circuit 125, in response to control signals produced by the processor 120, produces appropriate valve control signals for actuating the controllable valve 142.

Commands, warnings or data may be verbalized locally to the user from the fluid information unit through the loudspeaker 229. Warnings or commands may be provided as verbal information, or as a tone. Audible meter readings may be requested by the user. The user is provided with a user interface 227 to request data. The user interface 227 may be in the form of a push-button. A signal from the user interface 227 may be directed to the processor 120 to provide the current meter readings audibly to the user through the loudspeaker 229. The user may also be warned by an audible signal that the demand side management program has reduced the flow of fluid to one or more appliances.

Figure 6:
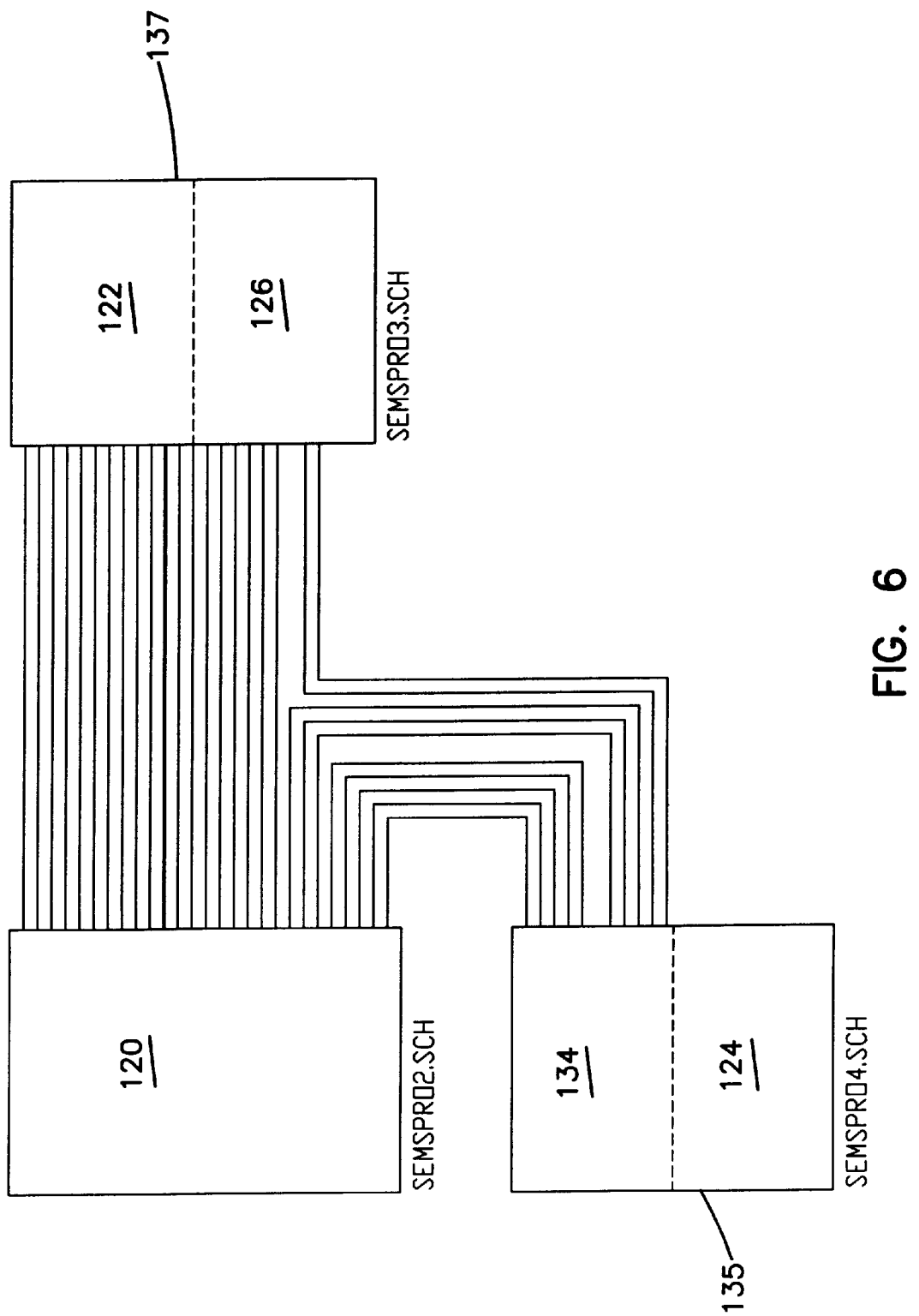
FIGS. 6–9 are schematic diagrams of various components and interconnections therebetween comprising a fluid dispensing unit and fluid monitoring unit in accordance with one embodiment of the present invention.

Turning now to FIGS. 6-9, there is illustrated in schematic diagram form one particular embodiment of a fluid metering apparatus in accordance with the present invention. In FIG. 6 the processor 120 coordinates the operations of the fluid information unit 34 as well as those performed by the fluid dispensing unit 30. Integrated circuit component 135 includes serial communication ports, control lines, and power lines for communicating control, information, and power signals between the fluid information unit 34 and fluid dispensing unit 30. The processor 120 communicates with the fluid dispensing unit 30 by transmitting various information and power signals through input/output circuitry 134. A communications integrated circuit component 137 includes modem 122 and voice synthesis circuitry 126 which provide for communication of fluid metering information and verbal warn and status information over the communication line 54.

Figure 7:
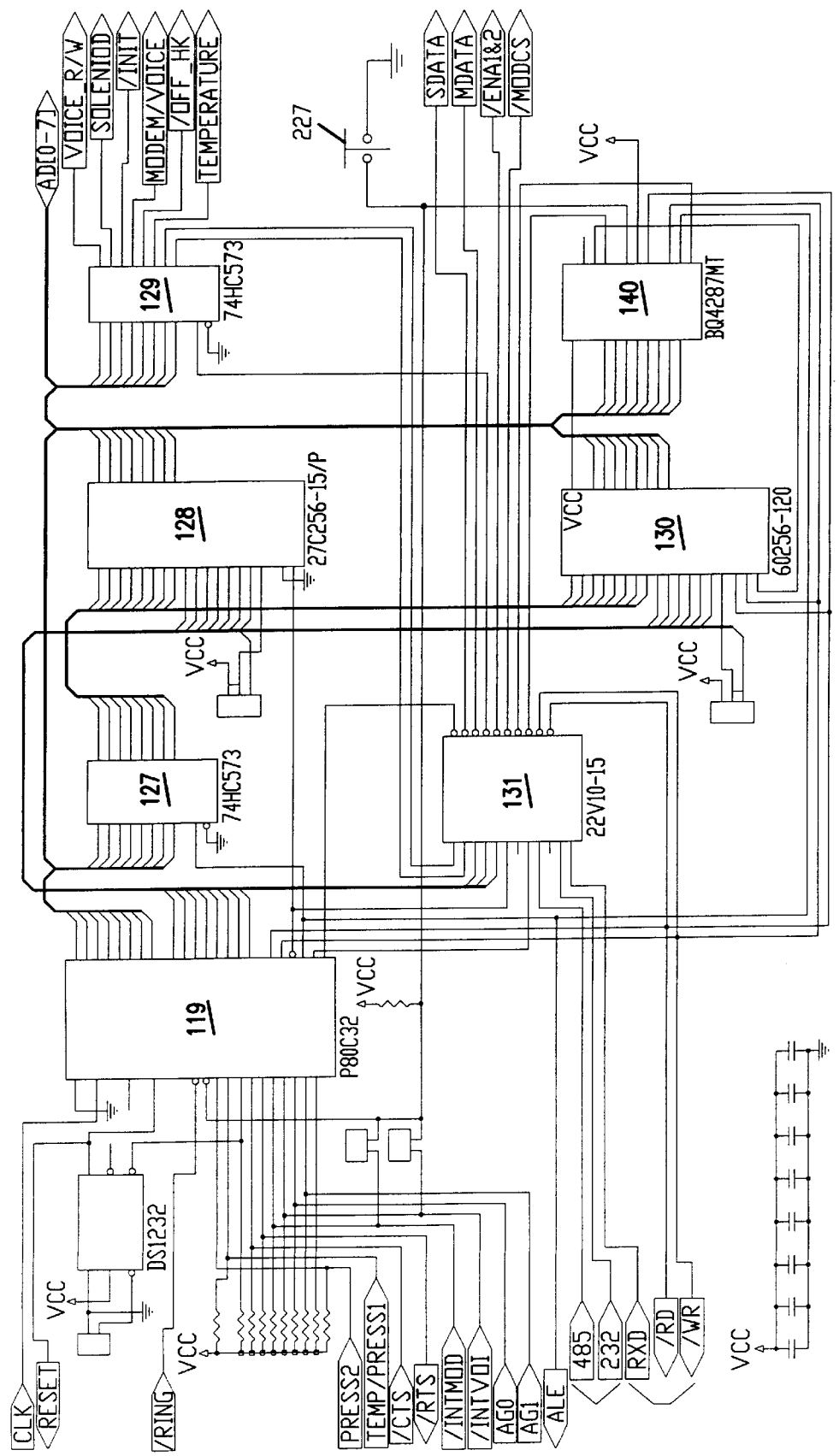

Referring now to FIG. 7, there is illustrated in detail the components and interconnections that comprise the processor and memory circuit 120 illustrated in FIG. 6. A microcontroller 119 cooperates with static random-access-memory (SRAM) 130 programmable read-only-memory (PROM) 128, control register 129, and address demultiplexer 127 to coordinate the operation of the fluid information unit 34 and the fluid dispensing unit 30. A real-time clock 140 provides time and date information to the microcontroller 119 for purposes of time and date stamping fluid metering data.

Figure 8:
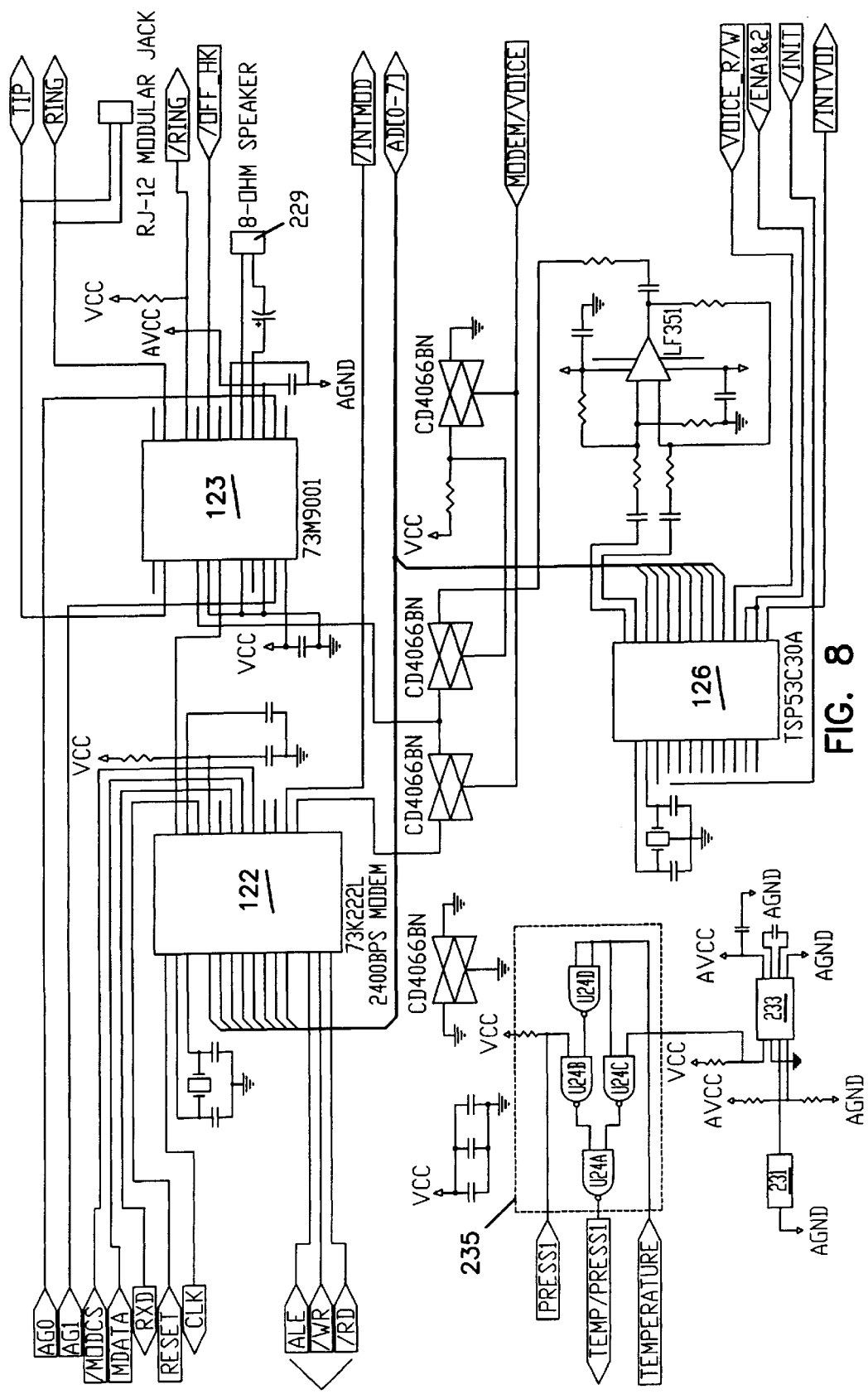

The components and interconnections illustrated in FIG. 8 are representative of the modem and voice synthesis integrated circuit component 137 illustrated in FIG. 6. Fluid metering information and verbal warn and status information processed by the microcontroller 119 may be communicated to a local speaker (not shown) in addition to a remotely located utility or fluid source managing entity by use of the modem 122 and telephone communication interface 123. It is noted that valve control signals, fluid metering system configuration parameters, and other information signals transmitted from a remote utility or fluid source managing entity are communicated to the fluid information unit 34 through modem 122 and telephone communication interface 123. Speech synthesis circuit 126 provides for the production and transmission of verbal messages produced by the microcontroller 119 which are transmitted over the communication line 54 through the telephone communication interface 123 and to the user via the loudspeaker 229.

The temperature sensor 231 is connected to a voltage to frequency converter 233. The temperature sensor may be, for example, a thermistor. The variable frequency output from the voltage to frequency converter 233 is directed to a sensor selection circuit 235. The sensor selection circuit 235 has a second input PRESS1 from the supply pressure sensor 144. A selection signal TEMPERATURE is directed to the selection circuit 235 from the control register 129. When TEMPERATURE is high, the selection circuit 235 directs the signal from the temperature sensor 231 to its output TEMP/PRESS1. When TEMPERATURE is low, the selection circuit 235 directs the signal from the supply pressure sensor 144 to the output TEMP/PRESS1.

Figure 9:
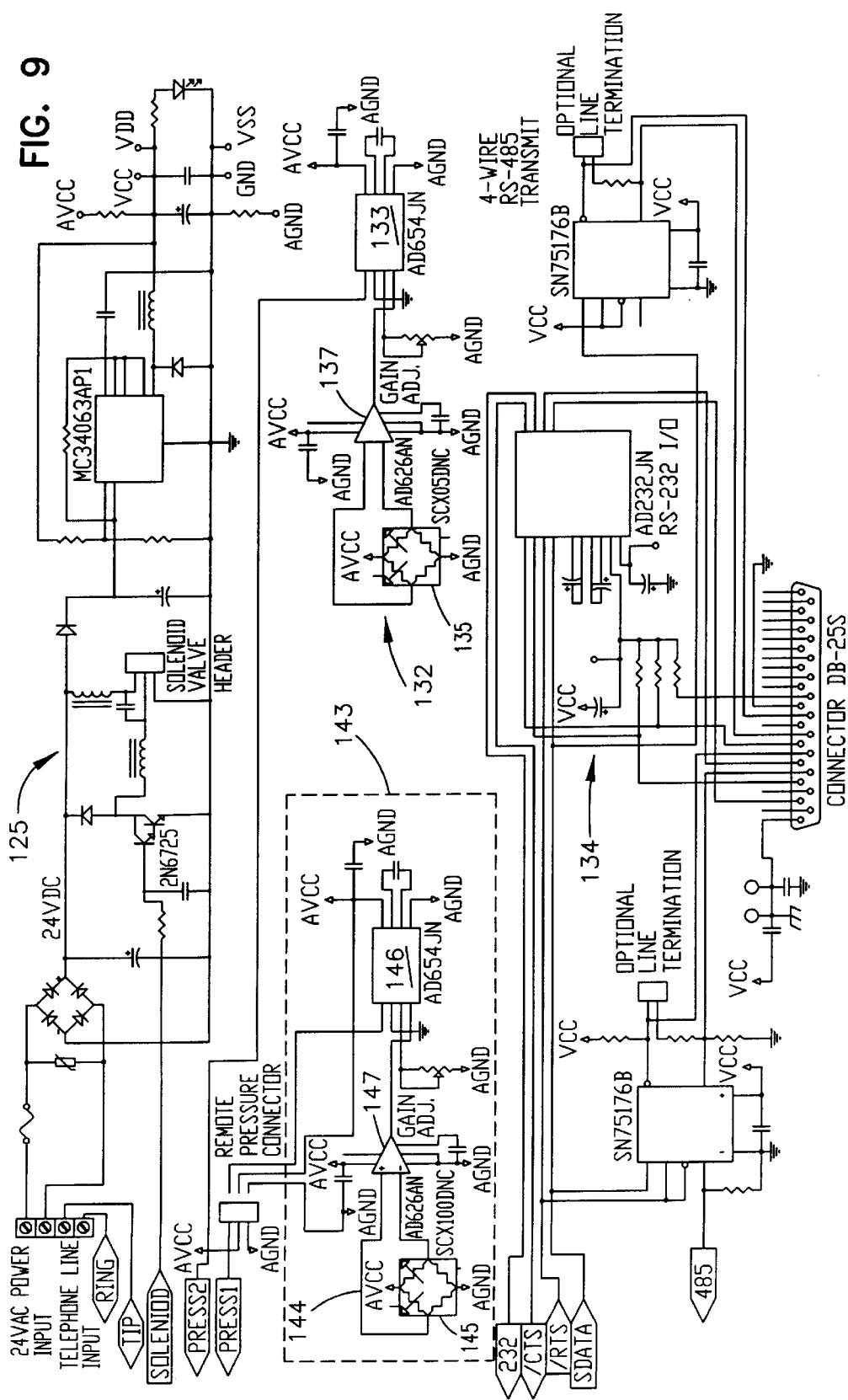

Referring now to FIG. 9, there is illustrated various components and circuitry which are housed within the fluid information unit 34, including a demand fluid pressure sensor 132, a valve control circuit 125, and input/output circuitry 134. The supply sub-circuit 143 represents circuitry that is provided within the fluid dispensing unit 30. The supply sub-circuit 143 includes a supply pressure sensor 144, signal processor 146, and input/output lines for communicating with the fluid information unit 34. The demand fluid pressure sensor 132 and supply pressure sensor 144 are of substantially similar construction, and respectively include a bridge-type pressure sensing element 135 and 145 coupled to an instrumentation operational amplifier (OP AMP) 137 and 147. The pressure sensing element 145 of the supply sub-circuit 143 senses the pressure PSUPPLY of the fluid in the supply pipe 28, and produces an output which is applied to the differential inputs of the instrumentation OP AMP 147. The voltage signal produced by the instrumentation OP AMP 147 is converted to a corresponding time-varying pressure signal by the voltage-to-frequency converter 146. The supply pressure signal produced by the voltage-to-frequency converter 146 is then transmitted to an input of the microcontroller 119.

Referring to the demand fluid pressure sensor 132, a bridge-type pressure sensing element 135 senses the pressure PDEMAND of the fluid in the demand pipe 32, and produces an output which is applied to the differential inputs of the instrumentation OP AMP 137. The demand pressure voltage signal produced by the instrumentation OP AMP 137 is converted to a corresponding time-varying demand pressure signal by the voltage-to-frequency converter 133. The demand pressure signal produced by the voltage-to-frequency converter 133 is then transmitted to an input of the microcontroller 119. As discussed previously, the microcontroller 119 performs a comparison between the demand pressure signal produced by the voltage-to-frequency converter 133 with a pre-established demand pressure signal stored in ROM 128 to produce a demand pressure error signal. The microcontroller 119 transmits the demand pressure error signal to the valve control circuit 125 which, in turn, actuates the controllable valve 142.

The microcontroller 119 also compares the supply pressure signal produced by the voltage-to-frequency converter 146 provided in the fluid dispensing unit 30 with the demand pressure signal produced by the voltage-to-frequency converter 133. The microcontroller 119 determines the pressure difference between the supply pressure and the demand pressure signals using these signals, and produces a pressure difference signal which is used when computing the volume of fluid flowing through the controllable valve 142.

In accordance with one embodiment, a characteristic flow rate factor associated with the controllable valve 142 is stored in the ROM 128. The microcontroller 119 computes the volume of fluid flowing through the controllable valve 142 by multiplying the supply and demand pressure difference signal by the characteristic flow rate factor.

Alternatively, a characteristic duty cycle factor associated with a controllable valve 142 responsive to digital valve control signals is stored in the ROM 128 and accessed by the microcontroller 119 when computing the volume of fluid dispensed through the controllable valve 142.

As further illustrated in FIG. 9, the input/output circuitry 134 includes components to support communication of information over RS-232 and RS-485 communication lines. In the embodiment illustrated in FIG. 2, a fluid information unit 98 communicates with one or more demand control units 106 over one or both of the RS-232 and RS-485 communication lines. These communication lines can further be utilized to form a local operating network (LON) to facilitate the communication of control and information signals throughout the fluid metering system. A local operating network suitable for facilitating communications within the fluid metering system is ESCHELON, which is an integrated hardware/software product produced by Motorola Corporation, under the direction of ESCHELON Corporation. Local operating networks are relatively inexpensive and provide control over multiple nodes at low cost. It may be desirable to implement a local operating network within a distributed fluid metering system, such as that described previously with respect to FIG. 2, in order to manage fluid delivery through the fluid dispensing unit 92 and one or more independent demand control units 106.

The fluid information unit 34 may be used for measuring the relative density of the fluid passing through the valve 142. Relative density information may be of interest to fluid providers where the density of the fluid changes over time. For example, where the fluid is natural gas, methane, demand increases during cold periods. At such times, gas suppliers typically supplement the methane by mixing in another gas, for example propane at a mixing station. The added propane increases the caloric content per unit volume of gas delivered. However, gas suppliers are currently unable to determine the methane/propane ratio received by the consumer. Consequently, gas suppliers are unable to charge users for the increased caloric content of the gas delivered. In addition, gas suppliers are currently unable to determine whether there are any areas of the delivery network where the ratio of the gas mixture received by a user is different from the ratio of the gas mixture after leaving the mixing station. The methane/propane ratio received by the consumer may be determined by measuring the relative density of the gas passing through the valve 142, using the fluid information unit 34.

Another reason for measuring relative density is that the density change arising from the addition of propane introduces a need to recalibrate the fluid metering process that is the subject of U.S. Pat. No. 5,636,653. This need arises because the flow rate through the valve is dependent on the density of the fluid. Operationally, there are several possible historically known flow rate values, each related to a particular combination of appliances drawing fluid. The actual flow rate may vary from the known value by a small amount, depending, inter alia, on the density of the fluid. Thus, the fluid information unit is programmed to recognize a measured flow rate to be associated with an historically known flow rate if the measured flow rate is within a certain tolerance of an historically known flow rate.

Figure 10:
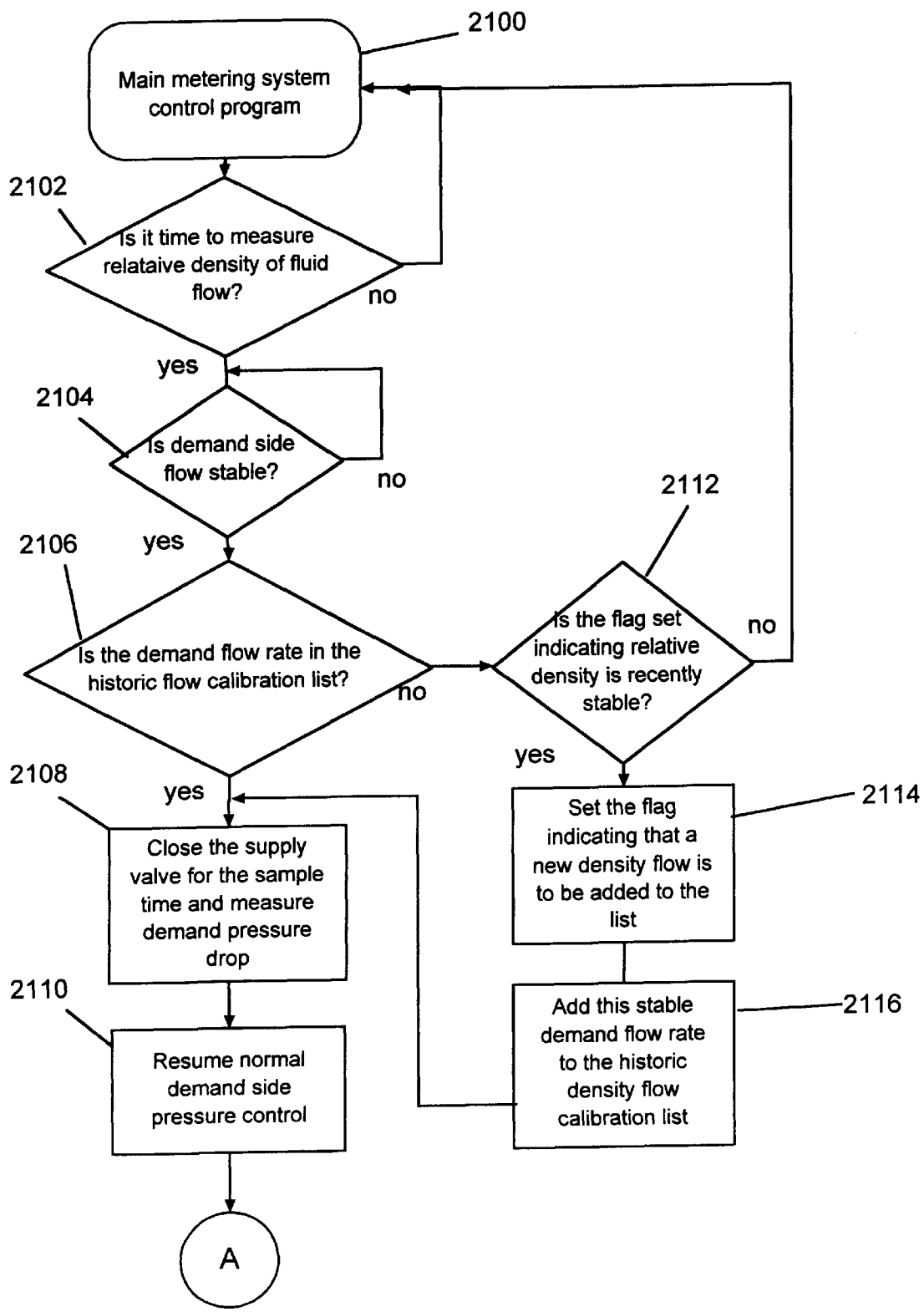
FIGS. 10–11 depict, in flow diagram form, a method for measuring relative density of the fluid passing through the meter in accordance with an embodiment of the present invention.
Figure 11:
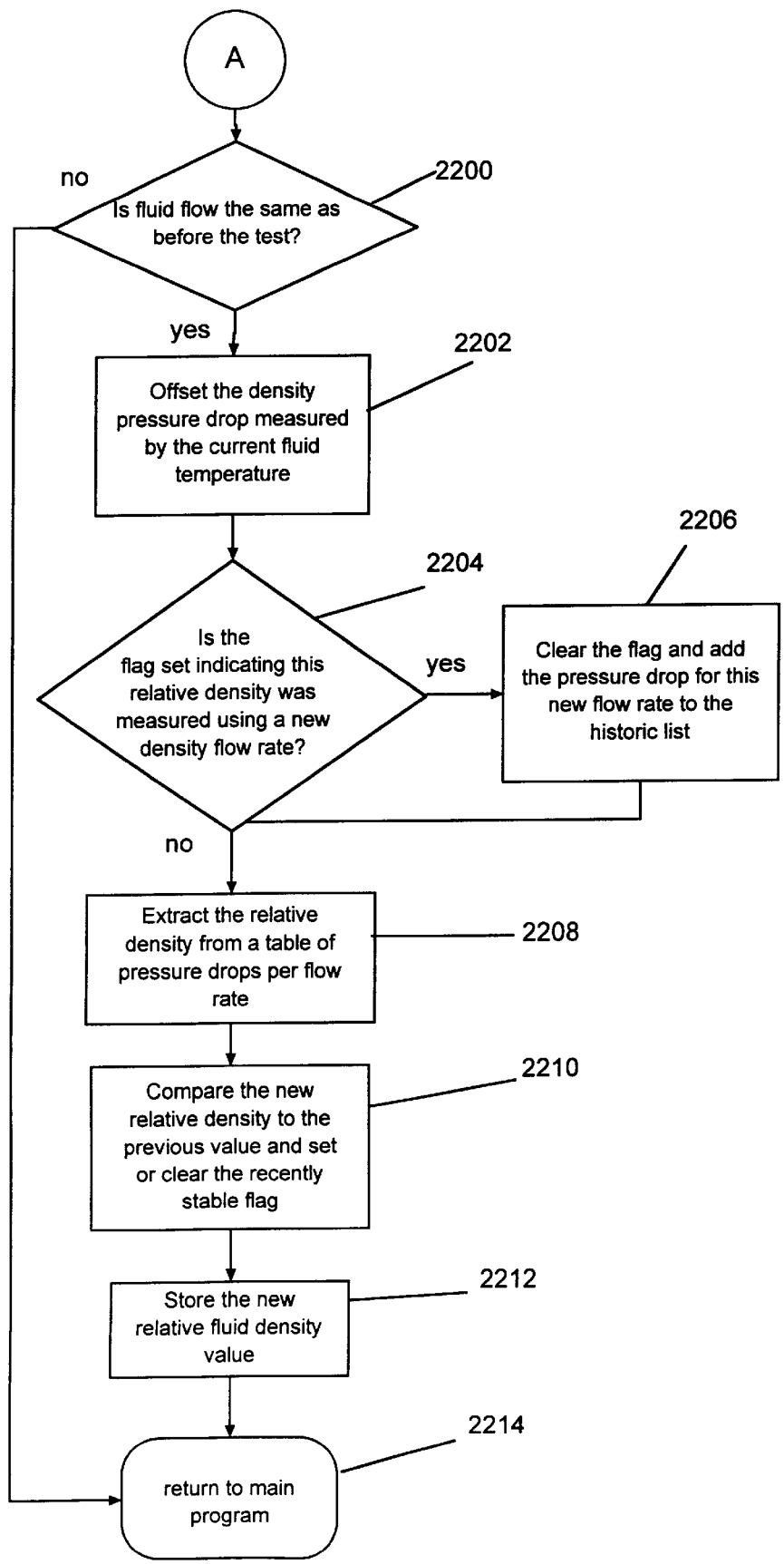

A procedure for measuring the relative fluid density is shown in FIGS. 10 and 11. The procedure includes measuring a drop in demand pressure while the valve 142 is closed. The fluid flow rate and demand pressure drop are then used to calculate a relative density since the pressure drop, for a given flow rate, is related to the density of the gas. The measurement of the relative fluid density may be made in a short time, typically less than 1 second, and does not significantly interrupt the process of metering the fluid delivered to the user. Additionally, the measurement of relative density may be made at regular intervals, for example once every hour, and an historical record of relative gas density may be maintained and made available to a central station in real time or in a batch download.

After it has been determined, at step 2102, that it is time for a measurement of relative fluid density to be made, it is determined whether flow in the demand side is stable, at step 2104, since the density measurement needs stable demand flow. Different stability criteria may be used, depending on how accurate a density measurement is desired. In illustration, the criterion may be that the demand flow has remained within a certain percentage of the same value for a predetermined duration, for example, the gas flow has remained stable to within ±10% for the previous 20 seconds.

Once it has been determined that the demand side flow is stable, it is determined whether a measurement of relative fluid density has already been performed at the current demand flow rate, at step 2106. It should be noted that many appliances that use the fluid have only one rate at which the fluid is demanded. For example, where the fluid is gas, most gas appliances, such as water heaters, furnaces, etc. operate by opening a valve to an open position to allow gas to pass into the appliance. Therefore, there is only one flow rate associated with the appliance. Therefore, for most density measurements, the current flow rate is likely to be one of a number fixed values that are dependent on which appliances are currently demanding gas. Gas stoves are among the few appliances where the user exercises control over how much gas is actually used. Accordingly, when a gas stove is on, the measured flow rate depends on the flow rate selected by the user. However, since stove use typically represents a small fraction of the day, most attempts at measuring gas density occur at one of a number of historically known flow rates.

If a measurement has previously been taken at the current demand flow rate, as determined at step 2106, then the supply valve 142 is closed for a sample time, typically less than 1 second, and the demand pressure drop over the sample time is measured, at step 2108. The pressure drop may be measured by sensing the demand pressure using the pressure sensor 132 at the beginning and end of the sample period. After the pressure drop has been measured, normal demand side pressure control is resumed, at step 2110.

After it has been determined at step 2106 that the fluid density has not previously been measured at the current demand flow rate, it is determined whether the relative fluid density has recently been measured to be stable, at step 2112, for example by comparing previously obtained density measurements. If it is determined that the relative density has not recently been stable, the program returns to the main metering system control program. If it is determined that the relative density has been recently stable, a flag is set indicating that a new flow rate/pressure drop combination is to be added to an historic list of fluid flow rates/pressure drops, at step 2114. The new fluid flow rate is then added to the historic list, at step 2116, before proceeding with the pressure drop measurement at step 2108.

After measuring the pressure drop, at step 2108, the normal demand side pressure control is resumed and the fluid flow rate is measured again and compared to the flow rate obtained before the measurement, at step 2200. If it is determined that the flow rate has changed, then the program returns to the main program without recording any results. If the flow rate has not changed, then the program continues.

The fluid information unit 34 is provided with a temperature sensor 231 to measure the temperature of the fluid passing though the valve 142. Since the pressure and density of the fluid may vary with fluid temperature, the measured pressure drop is adjusted, at step 2202 to remove any difference in pressure drop resulting from a difference between the current temperature and the temperature assumed for the calibration values.

If it is determined that the flag indicating that a new flow rate is being used has been set, at step 2204, then the flag is cleared and the measured pressure drop added to the historic list, step 2206.

The relative density of the fluid is then extracted from a table relating pressure drops and flow rates, at step 2208, as discussed below. The newly acquired value of relative density is compared with the previous value and the flag indicating recently stable density is set or cleared accordingly, at step 2210. The new fluid density value is then stored, at step 2212, before the program returns to the main program at step 2214.

Before the calculation of the relative density can be made, certain calibration values of flow rate, F0, pressure drop, ΔP0, and density, ρ0, are loaded into the fluid information unit 34. These may be measured and loaded into the fluid information unit 34 at the time of installation If the gas density is unknown or unmeasurable at the time of installation, a calibration density value may be downloaded to the information unit 34 from a central station at a later time.

Figure 12:
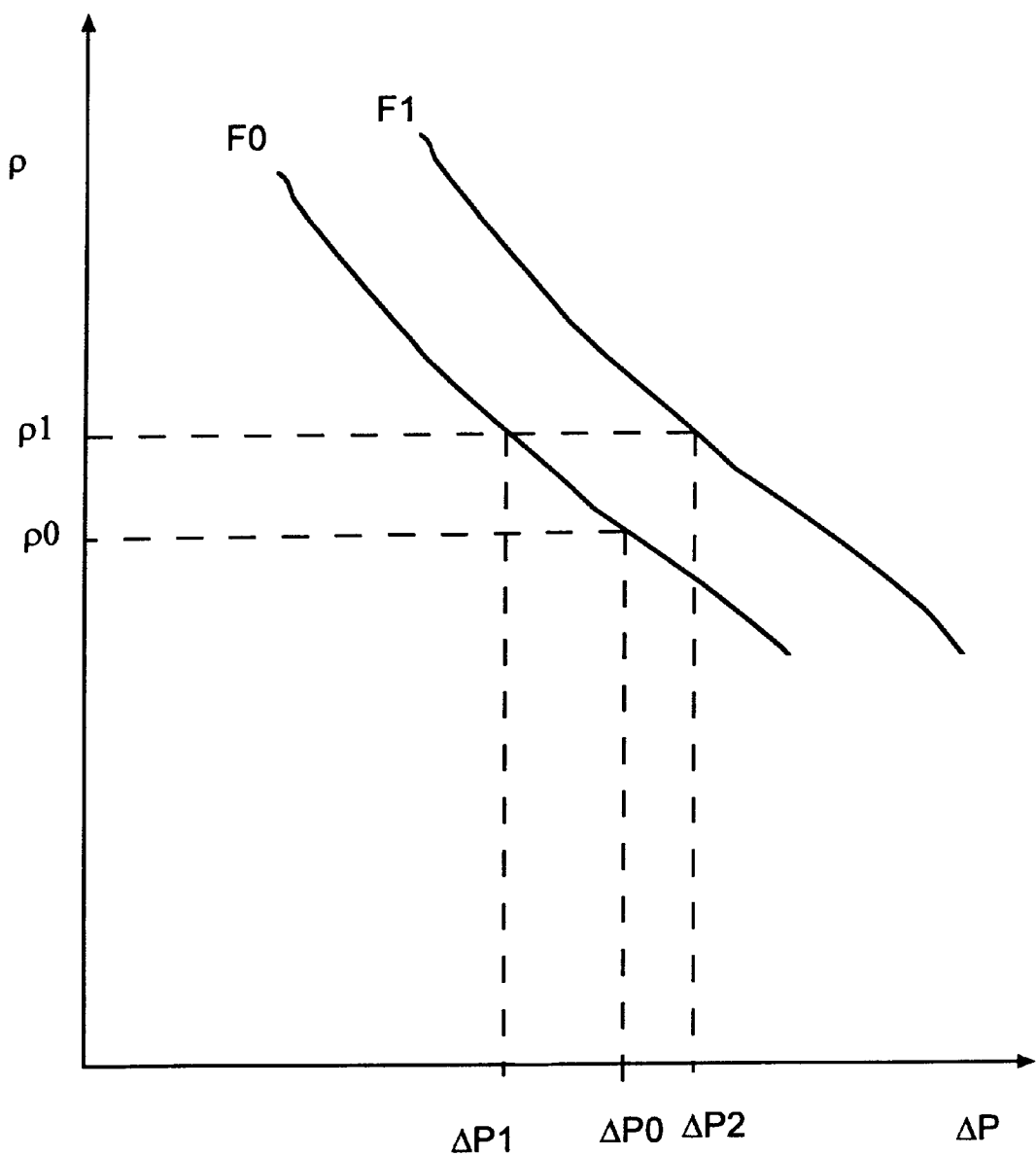
FIG. 12 is a graphical representation showing how the relationships between density, flow rate and pressure drop are used in the method illustrated in FIGS. 10–11.

The calculation of relative density, ρ, may be better understood with reference to FIG. 12. A known relationship exists between the pressure drop, ΔP, and the fluid density, ρ. The exact nature of the relationship is unimportant for the purposes of this explanation and the relationship is illustrated in a generic fashion, with higher pressure drops being associated with lower fluid density. The curve labeled F0 indicates the relationship between ΔP and p where the flow rate has a value of value F0. The initial operating point on the curve F0 is known since both ΔP0 and ρ0 are known. The ROM 128 is provided with the values of the curve F0, either in a look-up table or in analytical form that can be calculated for a given value of ΔP. Immediately following the initial calibration, there is only one value of flow rate in the calibration list, i.e. F0. Thus a density measurement can be made when the flow rate is determined to be at F0, as determined at step 2106. The measurement produces a new value of pressure drop, ΔP1, which can be related to a new fluid density value, ρ1, using the curve labeled F0.

The fluid information unit 34 may be provided with an analytical expression for density that is dependent on both flow rate and pressure drop, or a look-up table giving values of density for various pressure drops and flow rates. The new fluid density may be simply calculated for the different values of flow rate and pressure drop measured, where the dependence of density on flow rate and pressure drop is known.

Where this is not the case, and the relationship between pressure drop and density is only provided to the fluid information unit for one value of flow rate, the following procedure may be followed to permit the calculation of density at other flow rates. This procedure is operative where the fluid density is constant, for example at a value ρ1. The pressure drop, ΔP2 and the new flow rate, F1, are measured It is then possible to estimate the whole curve of ρ vs. ΔP for F1, by assuming that the F1 curve has essentially a similar shape to the shape of the F0 curve, but is offset by an amount given by ΔP2-ΔP1, as illustrated in FIG. 12. Thus, the curve F1, i.e. the relationship between the between ρ and ΔP, is known for a flow rate having a value F1.

Therefore, repetitive use of these procedures allows the user to calculate a) a new density where the flow rate is constant and b) the relationship between ρ and ΔP where the flow rate is new but the density remains constant. The historic flow calibration list can be updated with new ρ vs. ΔP curves for new flow rates. In many situations, there is a limited number of flow rates through the valve 142 because most appliances have a two position (on/off) valve for controlling flow of fluid, and so there are only as many flow rates possible through the valve 142 as there are combinations of appliances that may be on at any one time.

The fluid information unit 34 may be programmable to clear the historic flow calibration list where the flow characteristics through the demand pipe are changed, for example by replacing part of the demand pipe with a new section of different length or diameter, or by adding or removing an appliance.

In addition, the flow rate to, for example, a single appliance at a given pressure may vary according to fluid density. Accordingly, although the discussion hereinabove refers to discrete fluid flow rates for different combinations of active appliances, it will be understood that the fluid information unit may be programmed to recognize flow rates falling within a certain range of e.g. F1 to be associated with the F1 curve.

It will, of course, be understood that various modifications and additions can be made to the embodiments discussed hereinabove without departing from the scope or spirit of the present invention. Accordingly, the scope of the present invention should not be limited to the particular embodiments discussed above, but should be defined only by the claims set forth below and equivalents thereof.

I claim:

1. An apparatus for measuring density of a fluid flowing through a demand pipe, comprising:
   a fluid dispensing unit including a controllable valve couplable to an inlet of the demand pipe; and
   a fluid information unit including
      a demand pressure sensor for sensing a demand fluid pressure of the fluid in the demand pipe,
      a first communication channel between the fluid information unit and the controllable valve of the fluid dispensing unit,
      a processor, coupled to the demand pressure sensor and the controllable valve, for controlling the controllable valve between a closed and an open position to regulate the fluid flowing through the controllable valve and configured to calculate a relative density of the fluid flowing through the controllable valve based, at least in part, on a pressure measurement signal received from the demand pressure sensor.

2. An apparatus as recited in claim 1, further comprising a temperature sensor disposed to detect temperature of the fluid in the demand pipe, the temperature sensor being connected to the processor to deliver temperature signals thereto.

3. An apparatus as recited in claim 1, wherein the processor includes a memory to hold data relating fluid flow rates, demand pressure differences and relative fluid density.

4. An apparatus as recited in claim 1, wherein the processor further includes a second communication channel connectable to a central station to download data thereto.

5. An apparatus as recited in claim 1, wherein the processor closes the controllable valve for a sampling time period, and the demand pressure sensor detects the pressure of the fluid at the beginning and the end of the sample time period.

6. An apparatus as recited in claim 1, wherein the fluid dispensing unit further includes a supply pressure sensor disposed to detect supply pressure of the fluid supplied to the controllable valve, the first communication channel is connected to the supply pressure sensor and the processor is coupled to the supply pressure sensor.

7. An apparatus for managing flow of a fluid flowing through a supply pipe and a demand pipe to at least one appliance having a demand control unit, comprising:

a supply pressure sensor disposed to measure a fluid supply pressure in the supply pipe; and a fluid information unit connectable to the demand control unit, the fluid information unit including a demand pressure sensor disposed to sense a fluid demand pressure in the demand pipe, a communications channel connected to the supply pressure sensor, and a processor, coupled to the supply and demand pressure sensors and couplable to the demand control unit to transmit a control signal to reduce fluid demand in response to a measured supply pressure falling below a predetermined supply threshold level.

8. An apparatus as recited in claim 7, wherein the processor is adapted to select a control signal in response to an amount by which the supply pressure is lower than the supply threshold level.

9. An apparatus as claimed in claim 7, the fluid information unit further including a communication interface connectable to a central station, wherein the processor is adapted to transmit a notification signal through the communication interface to the central station in response to transmission of the control signal.

10. An apparatus as claimed in claim 7, wherein the fluid information unit further includes a memory connected to the processor to store data on control signal transmission.

11. An apparatus as claimed in claim 7, wherein the fluid information unit further includes a loudspeaker connected to the processor to deliver audible signals to the user.

12. An apparatus as claimed in claim 11, further comprising a switch connected to the processor, activatable by a user to instruct the processor to deliver audibly via the loudspeaker.

* * * * *